March 12, 1946.　　　M. J. PHILLIPS　　　2,396,529
GUN TURRET
Filed March 7, 1939　　　19 Sheets-Sheet 7
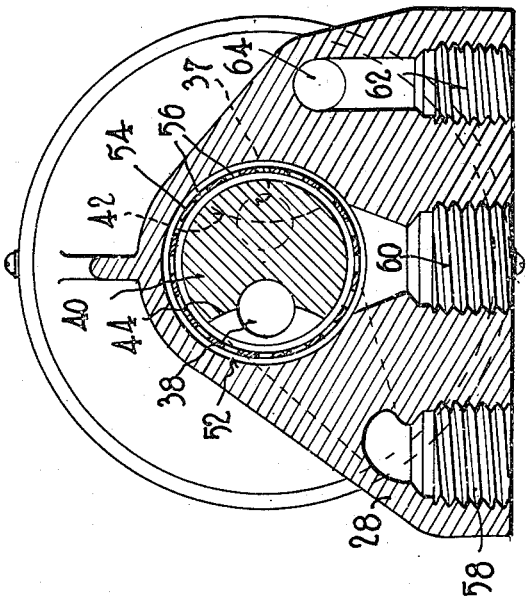
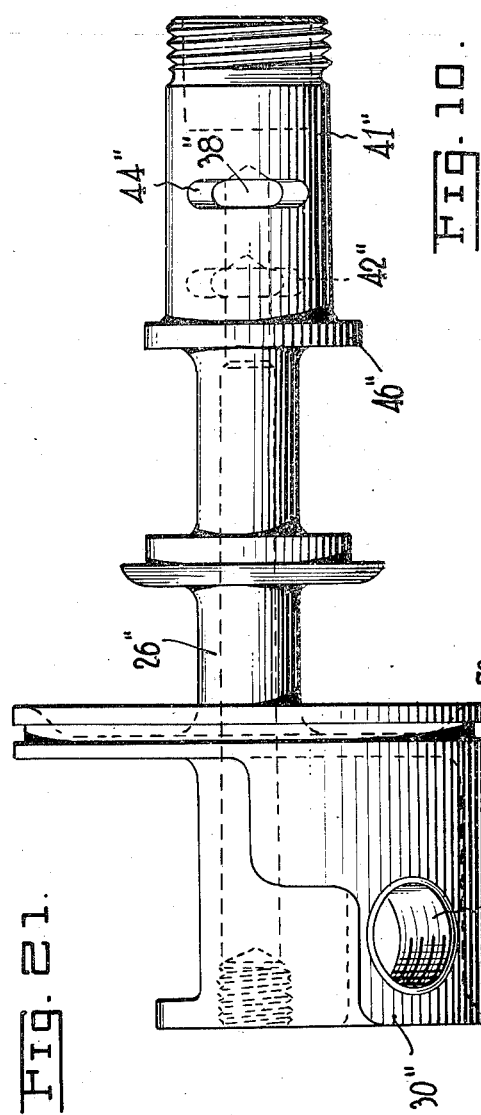
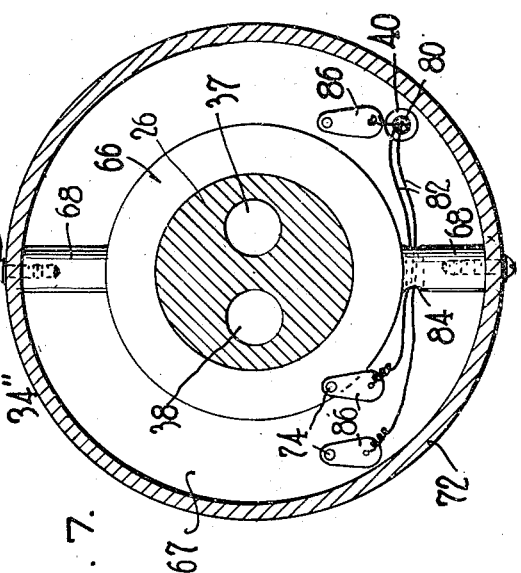
Inventor
Michael J. Phillips
By
Harrison Betts
Attorney March 12, 1946. M. J. PHILLIPS 2,396,529
GUN TURRET
Filed March 7, 1939 19 Sheets-Sheet 8
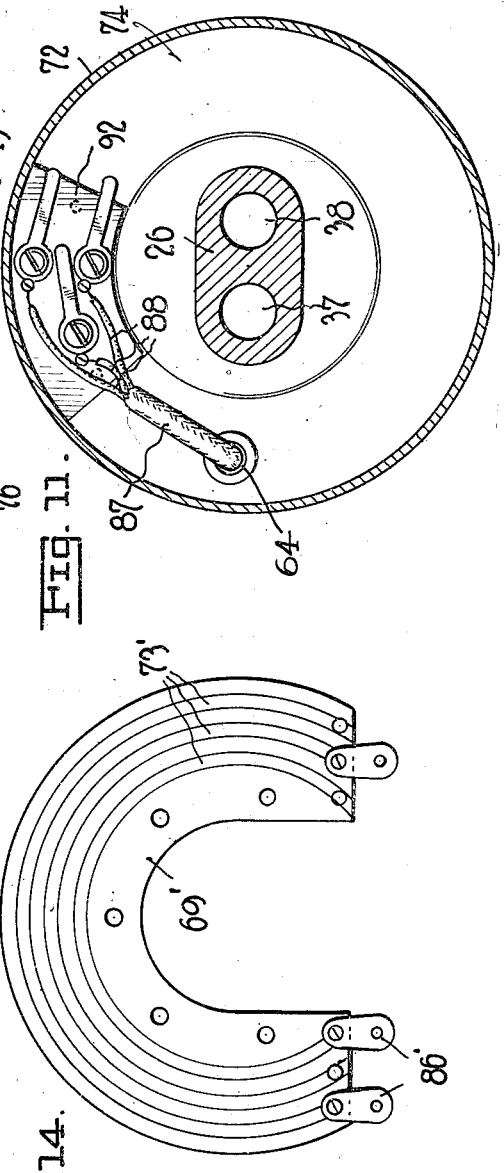
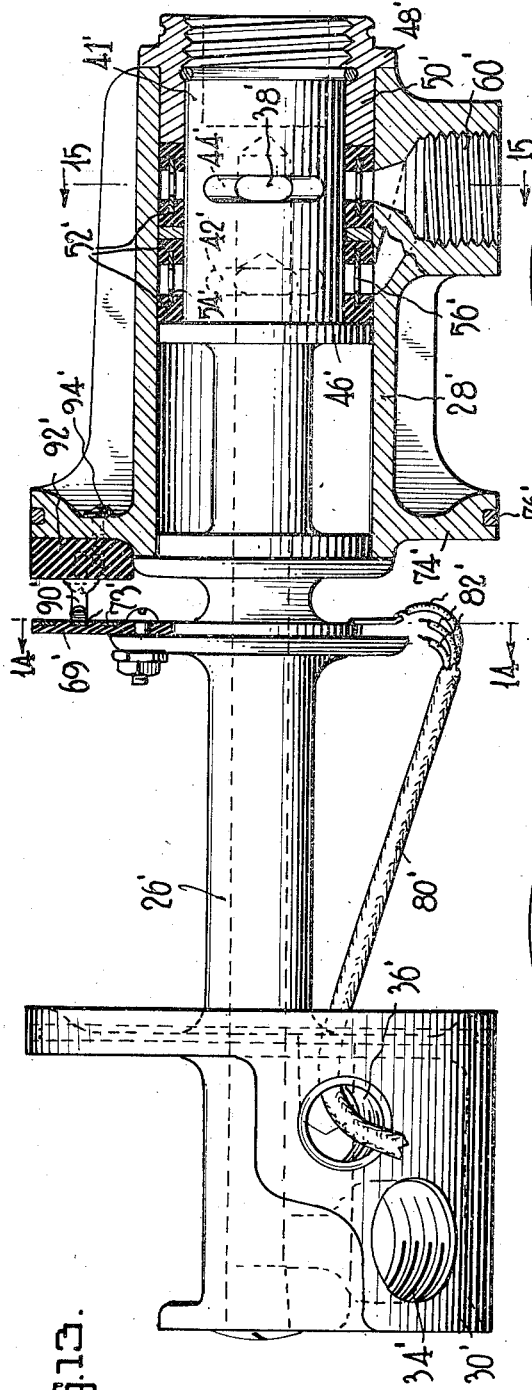
Inventor
Michael J. Phillips
By Harrison
Attorney March 12, 1946.  M. J. PHILLIPS  2,396,529
GUN TURRET
Filed March 7, 1939  19 Sheets-Sheet 9

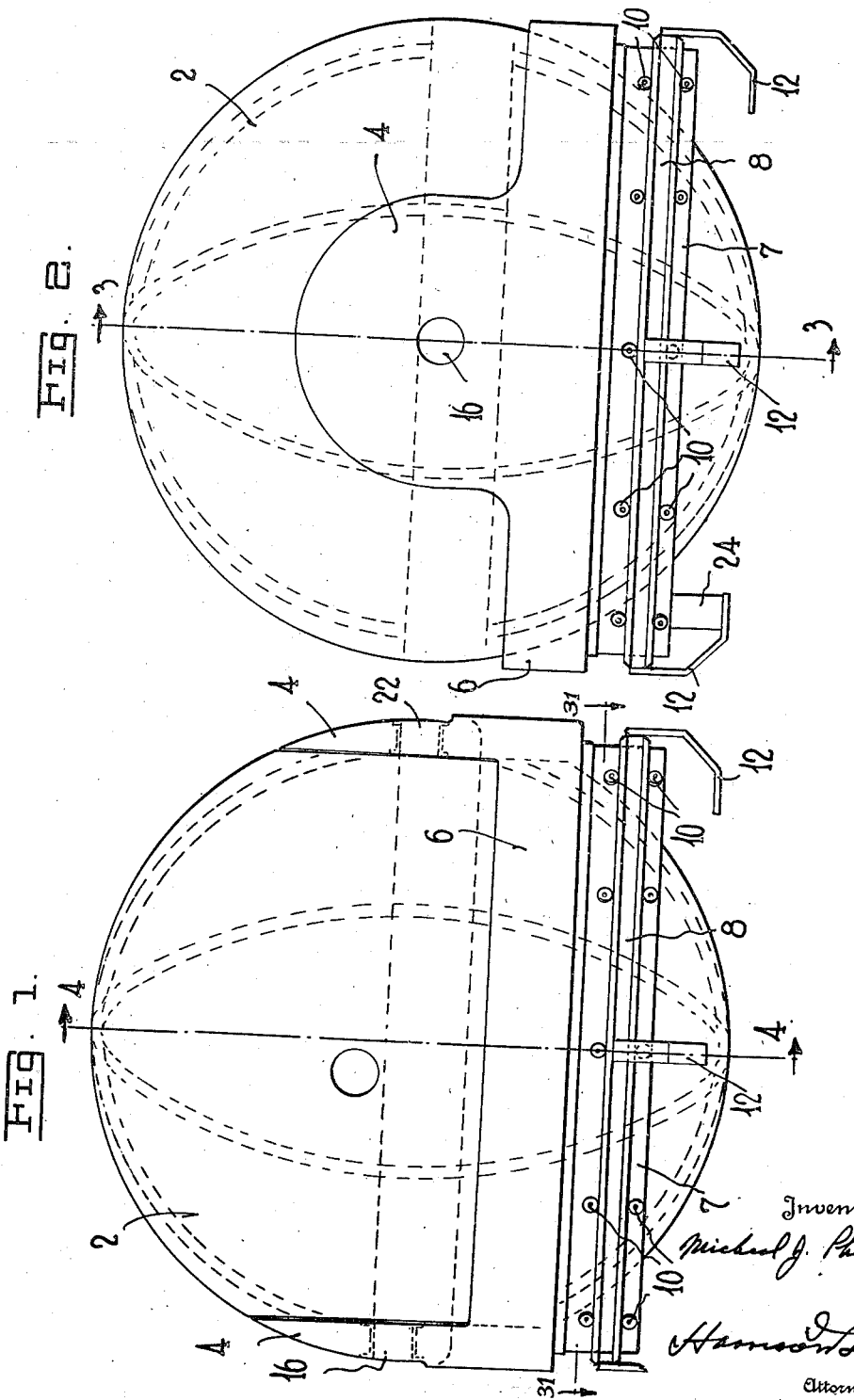

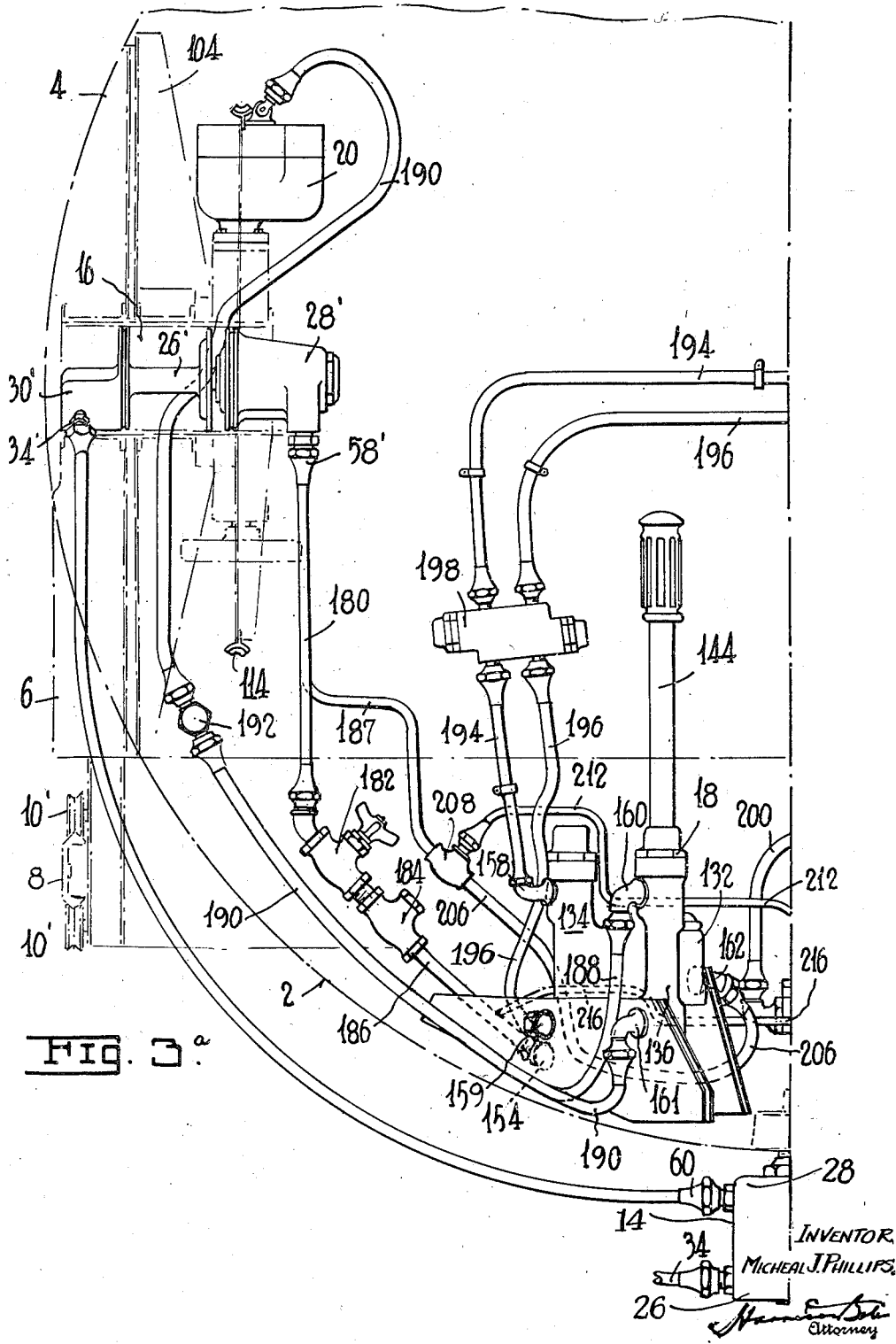

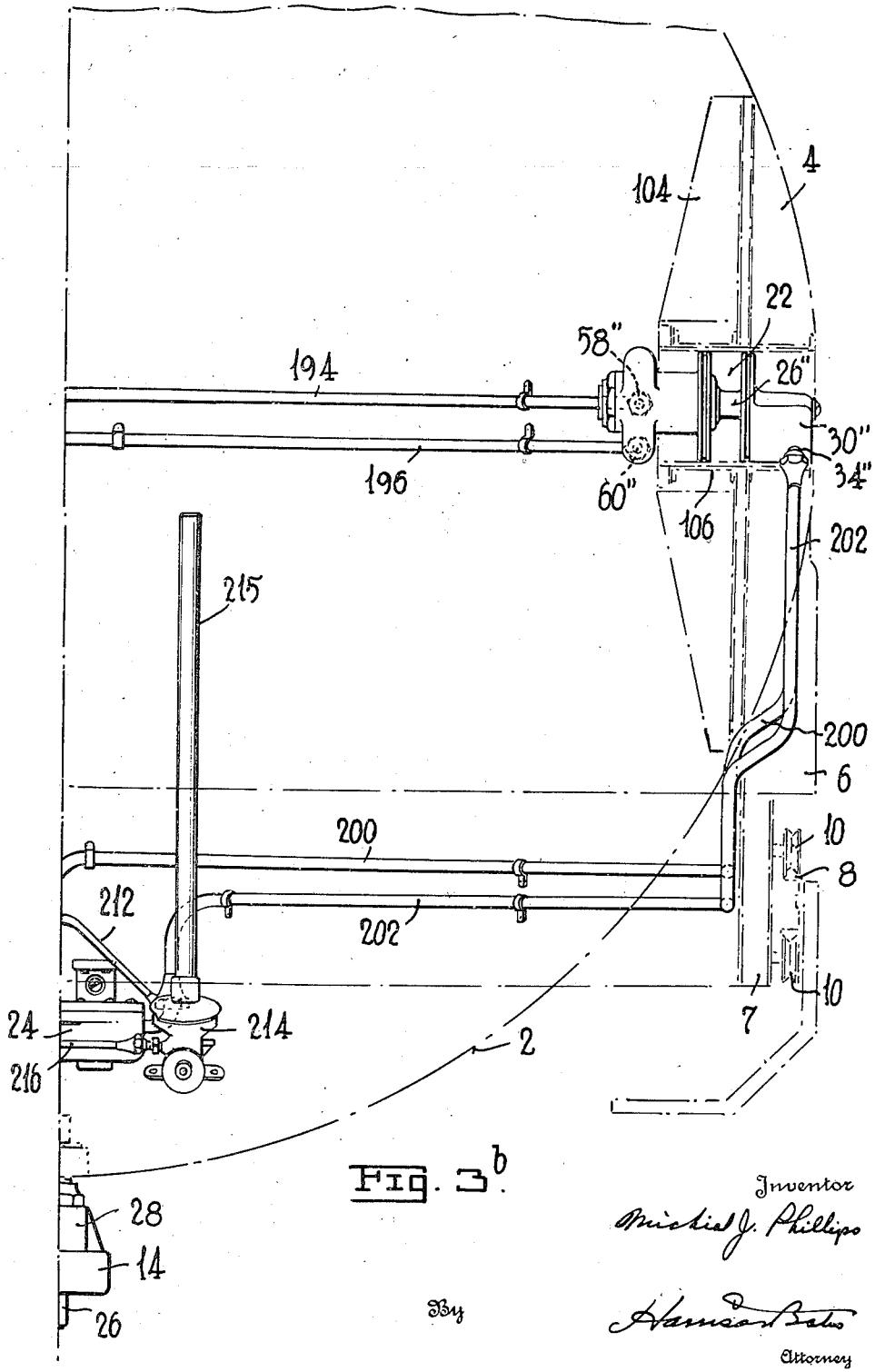

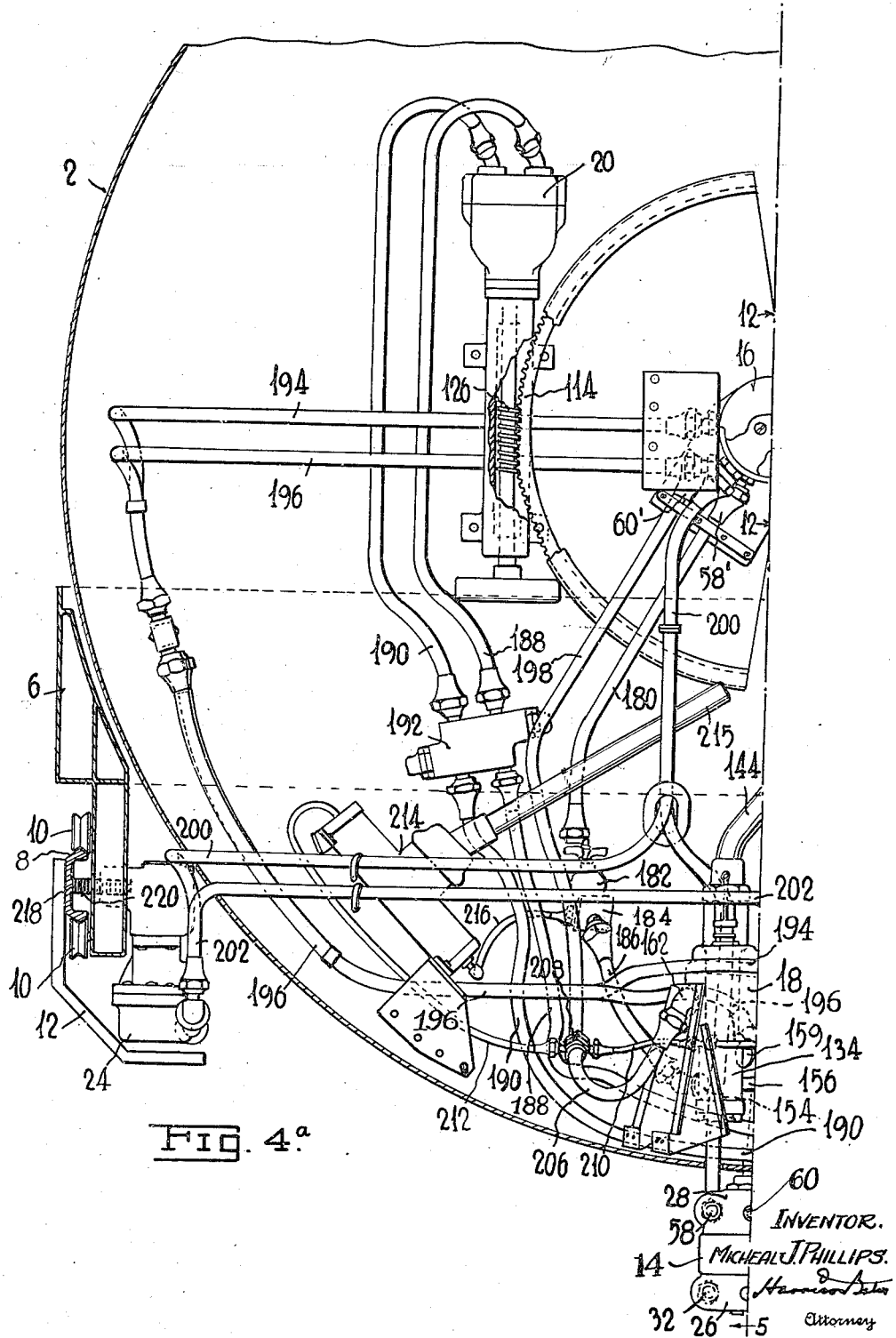

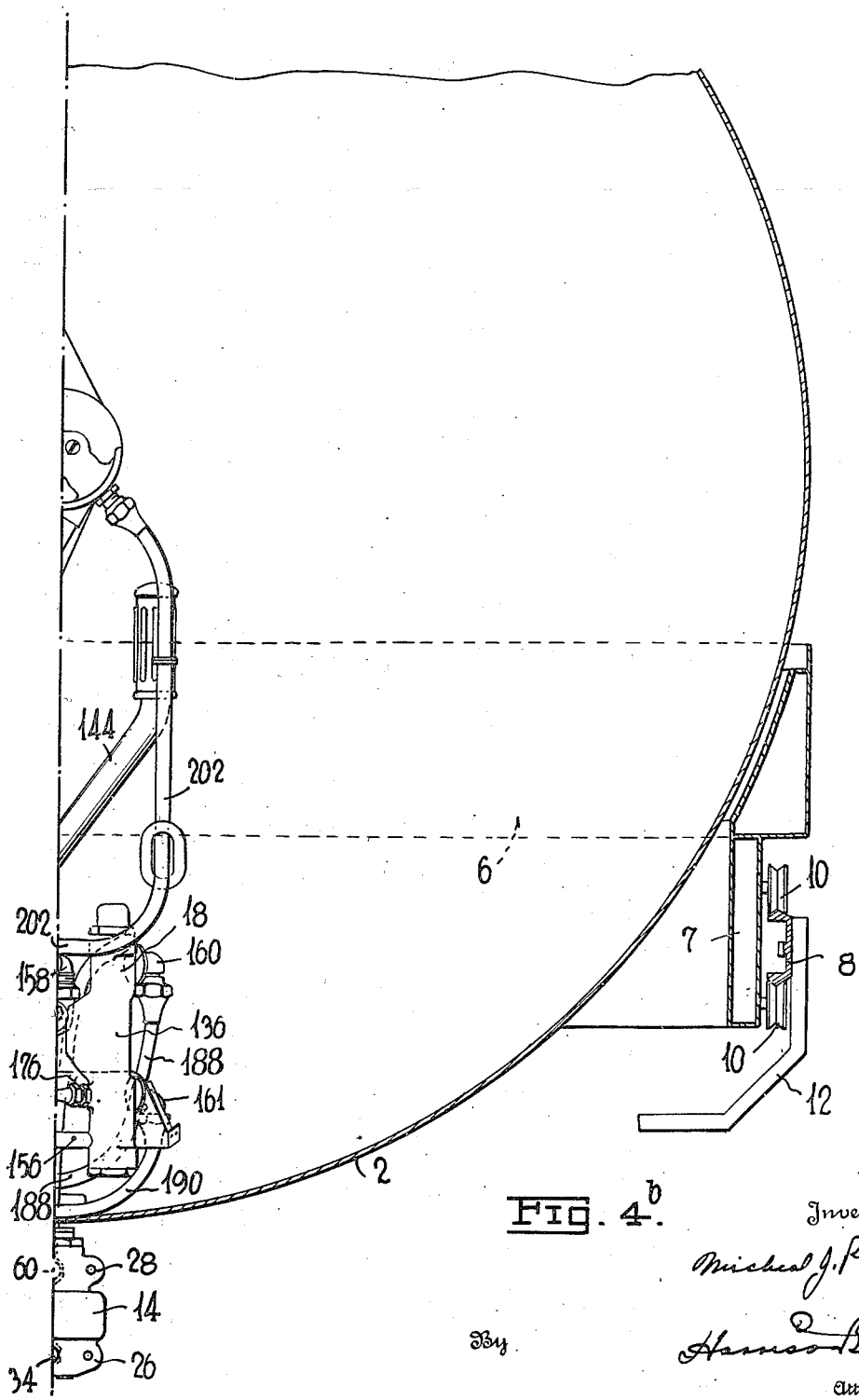

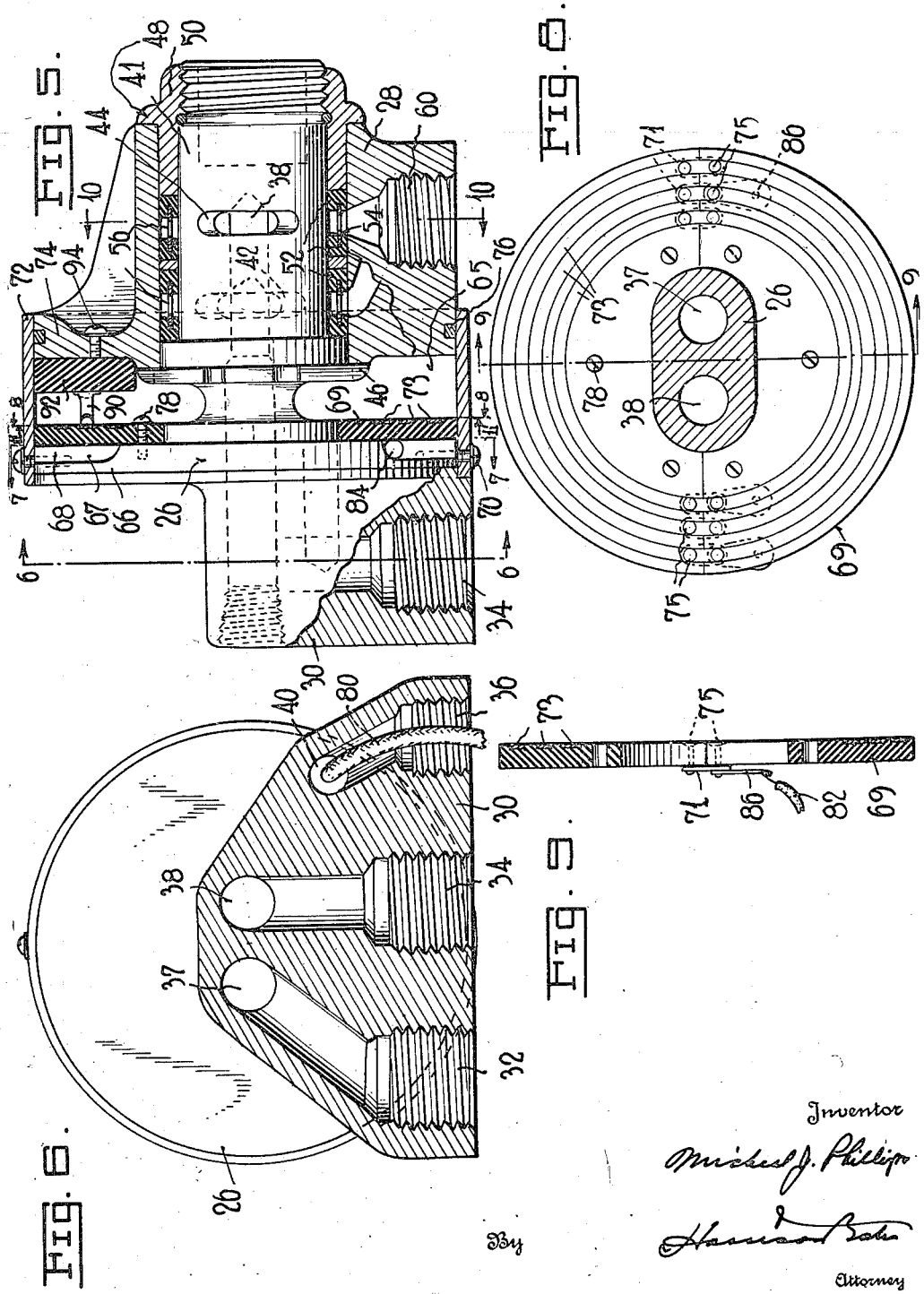

Inventor
Michael J. Phillips
By
Attorney

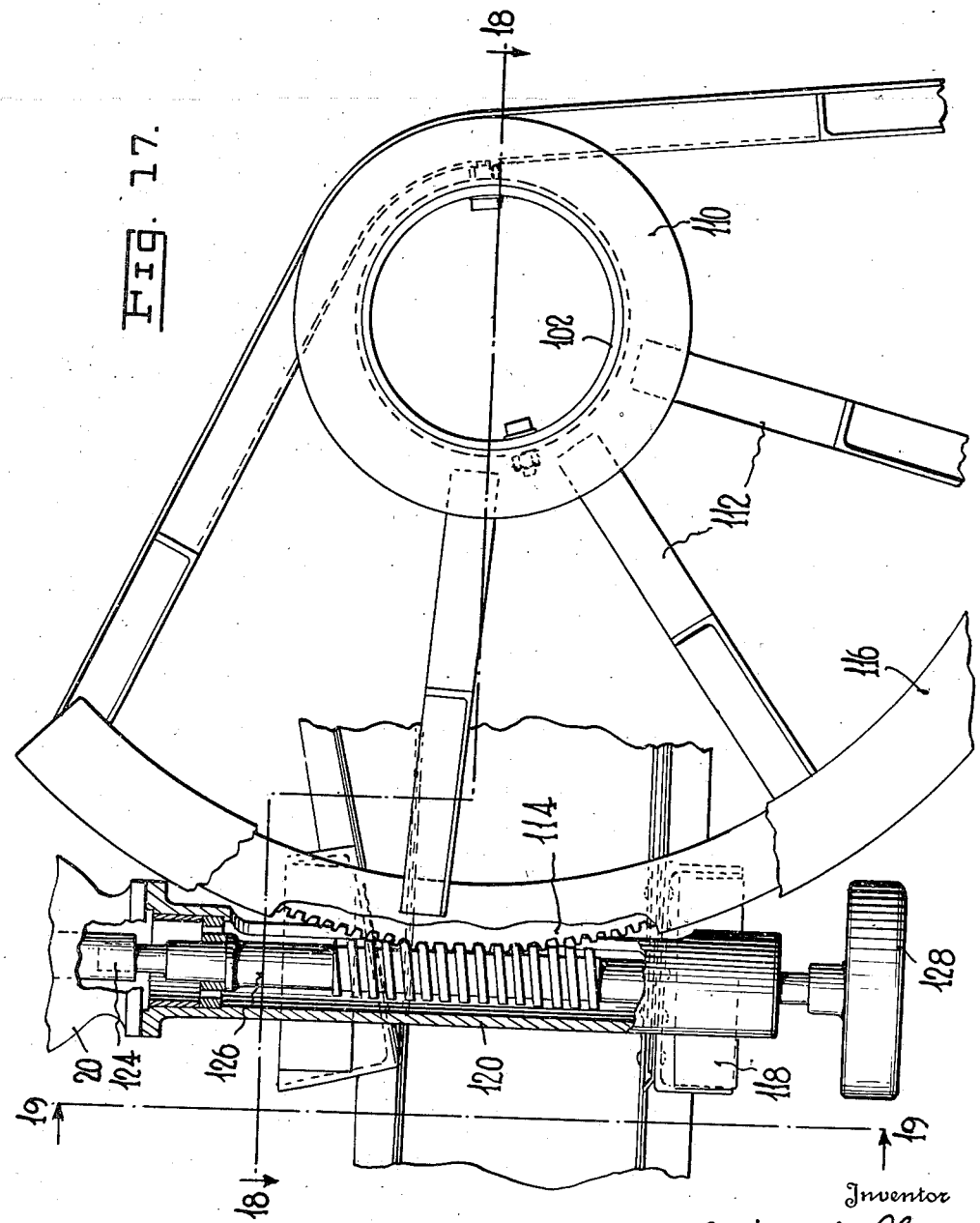

March 12, 1946.  M. J. PHILLIPS  2,396,529
GUN TURRET
Filed March 7, 1939  19 Sheets-Sheet 12
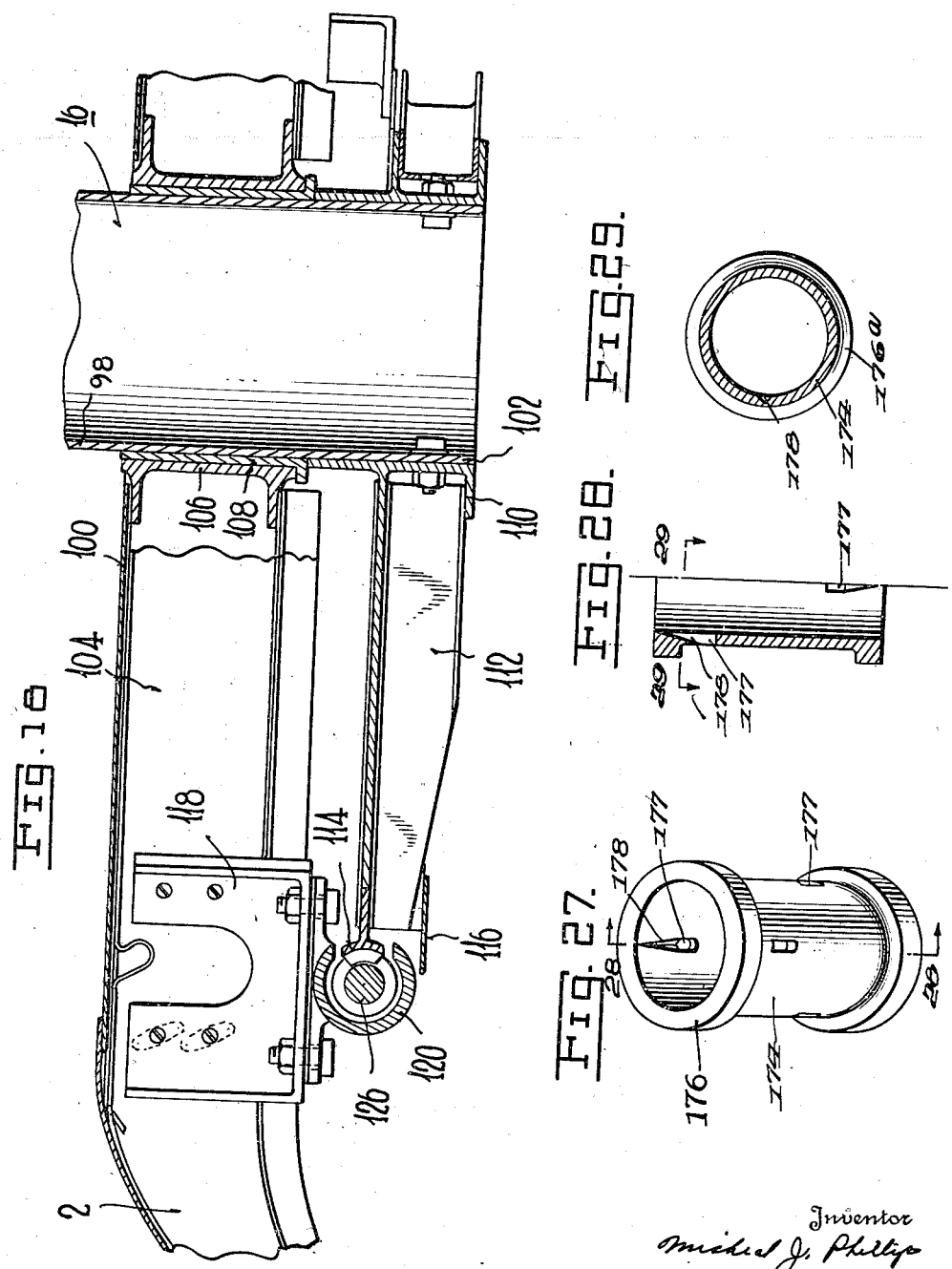
Inventor
Michael J. Phillips
By
Attorney March 12, 1946.　　　M. J. PHILLIPS　　　2,396,529
GUN TURRET
Filed March 7, 1939　　　19 Sheets-Sheet 13
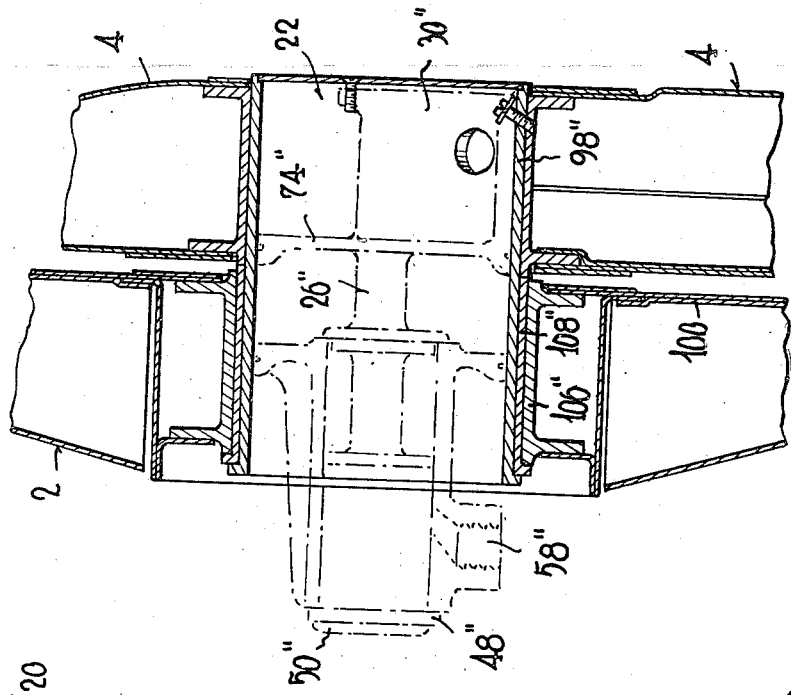
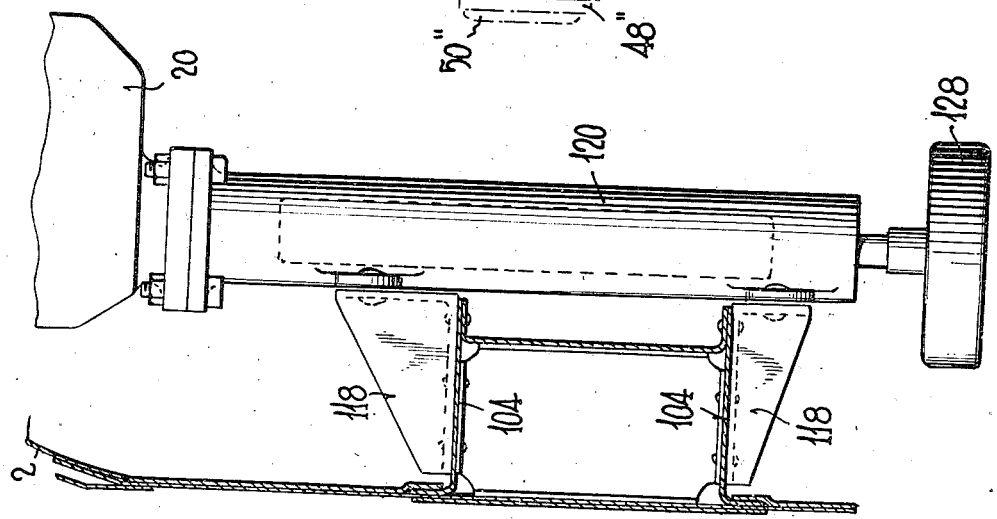
Inventor
Michael J. Phillips
By
Attorney

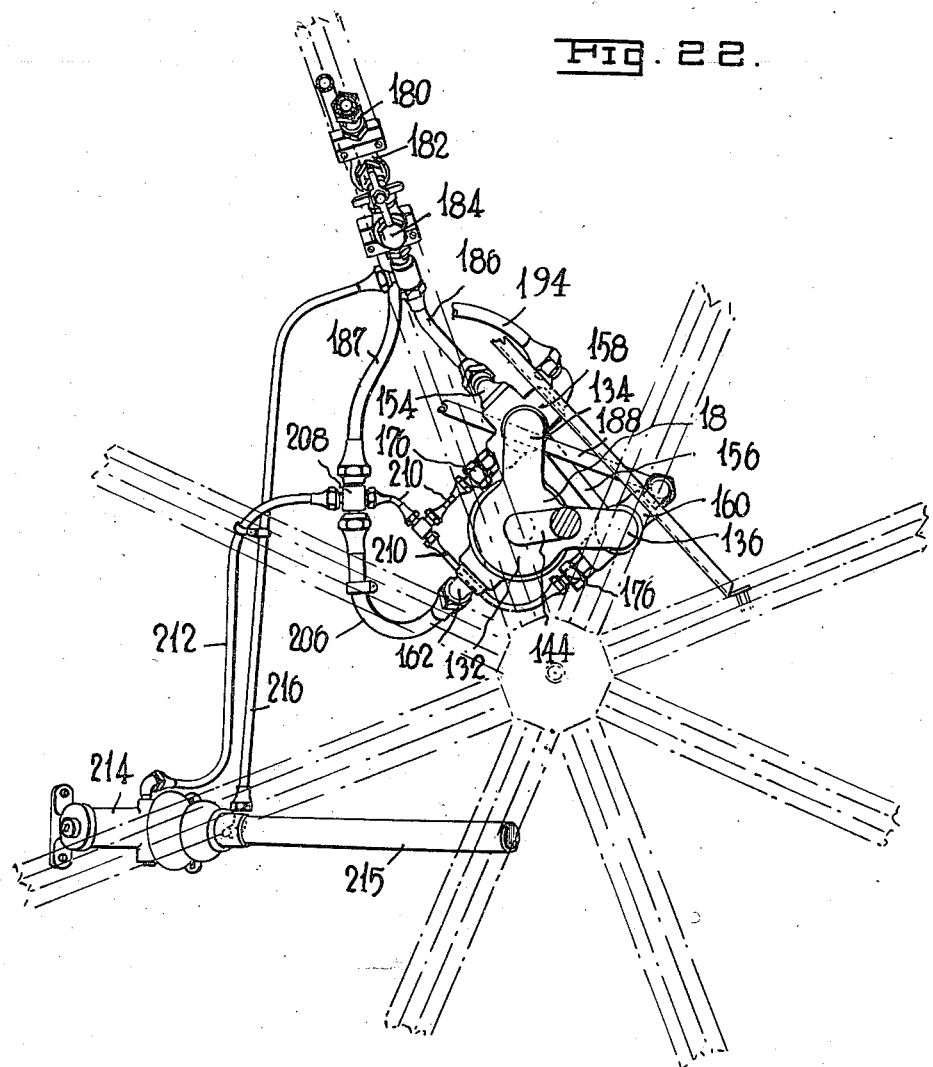

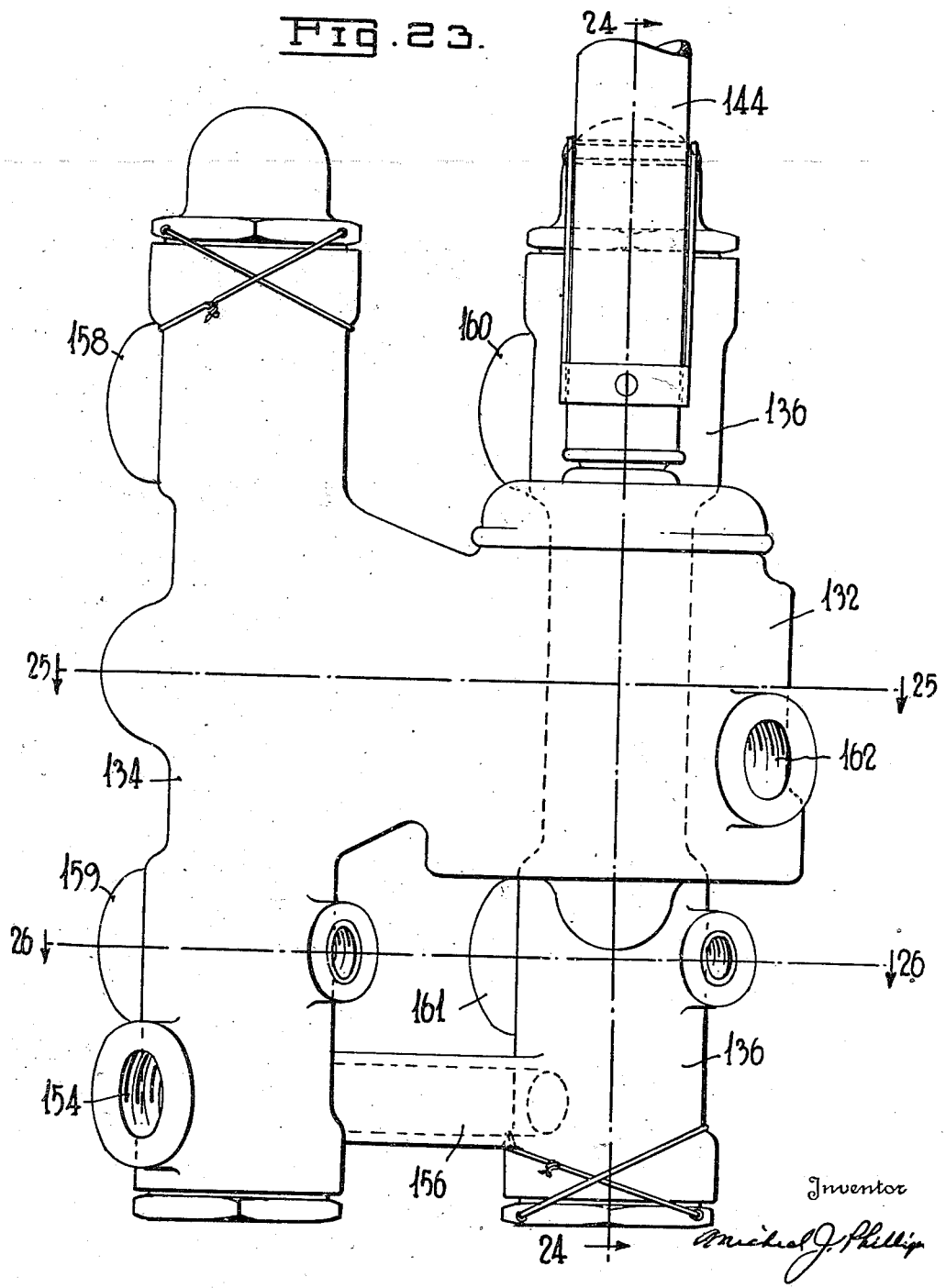

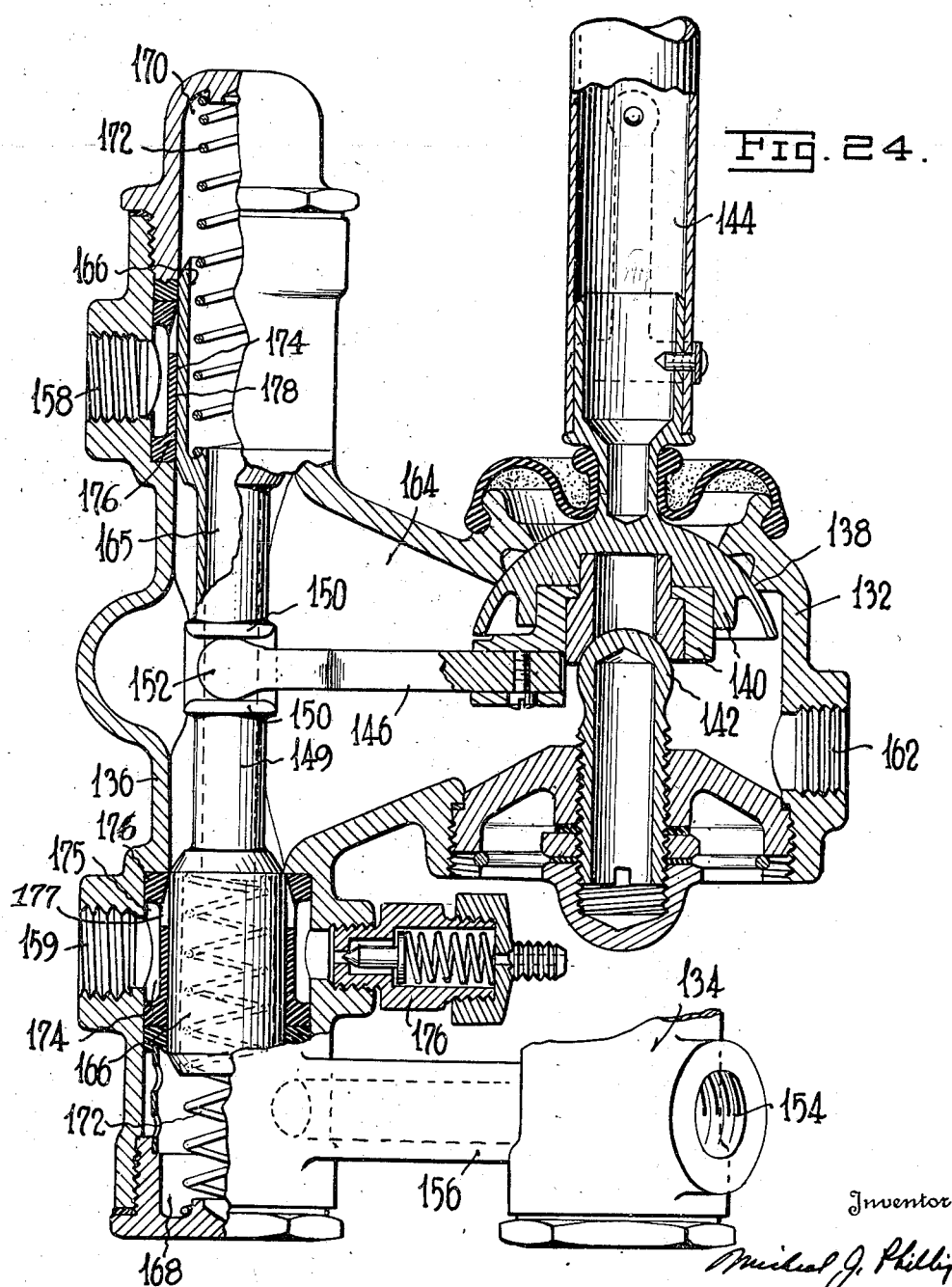

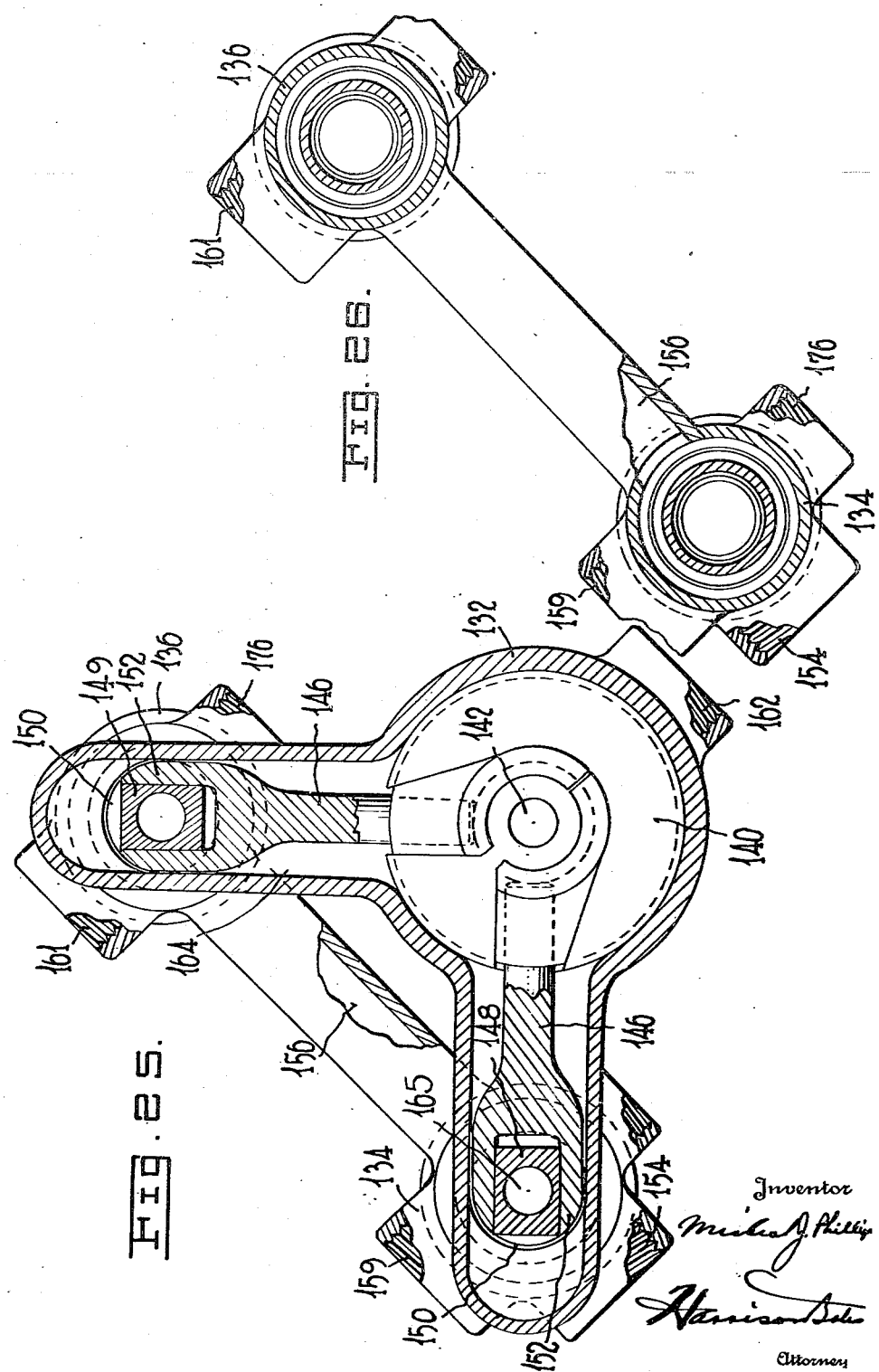

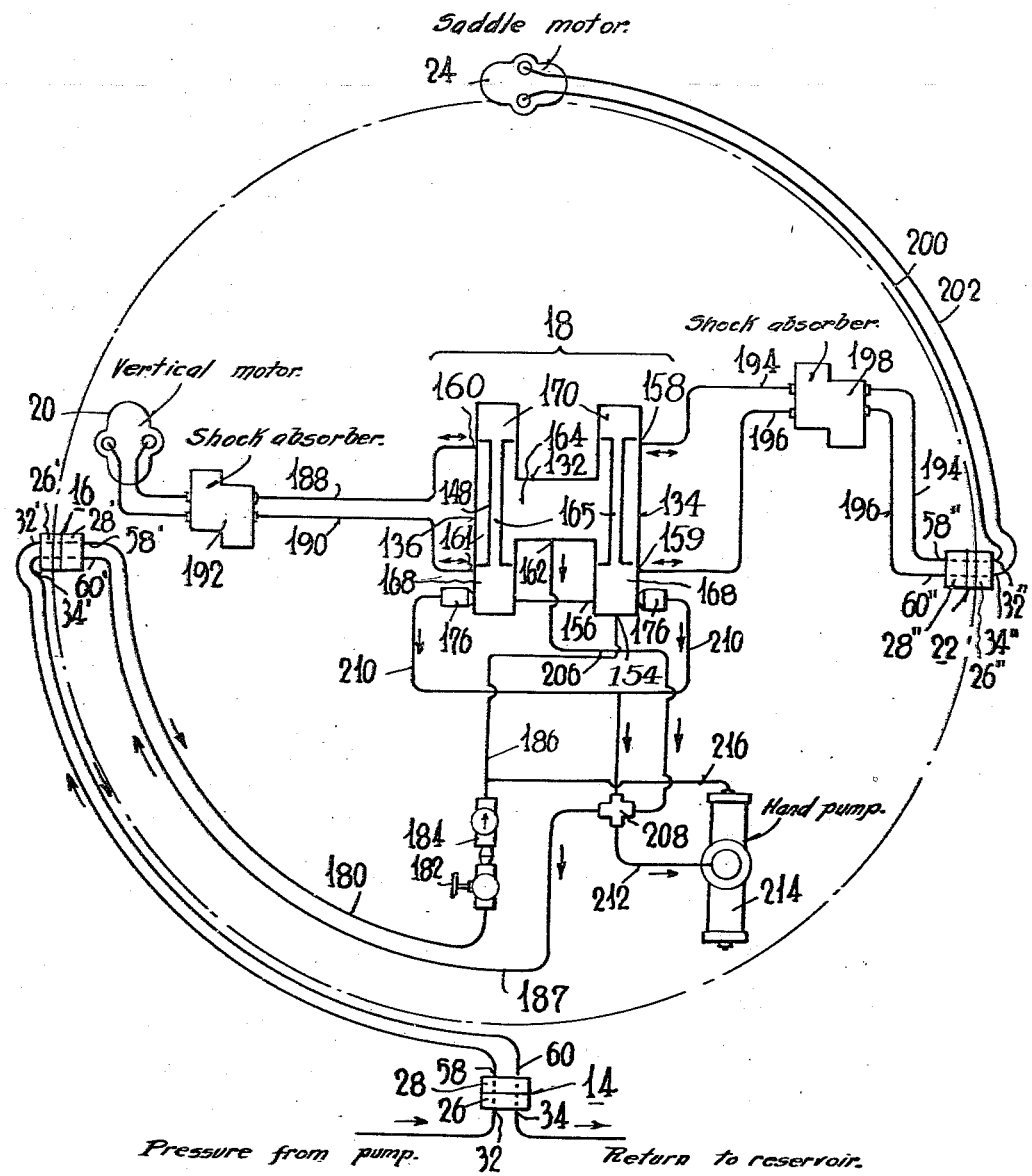

Patented Mar. 12, 1946

2,396,529

UNITED STATES PATENT OFFICE 2,396,529

GUN TURRET

Michael J. Phillips, Middle River, Md., assignor to The Glenn L. Martin Company, Baltimore, Md.

Application March 7, 1939, Serial No. 260,268

10 Claims. (Cl. 89—37.5)

The invention relates to gun turrets, and especially to gun turrets for aircraft.

An object of the invention is to produce a gun turret which can be controlled by an operator therewithin to turn in any direction, quickly and easily.

Another object of the invention is to provide such a turret which is so mounted as to present a decreased aerodynamic resistance, whatever may be its relative position. More specifically, with respect to this object, the turret is of generally spherical shape with two opposed flattened surfaces, and is mounted between ears opposite these flattened surfaces and having an outer contour formed at least in part as a continuation of the spherical surface of the remainder of the turret.

A further object of the invention is to provide a novel mounting for the turret, which permits the same to turn without danger of binding regardless of possible distortions of the track upon which it is mounted. This is accomplished primarily by mounting the turret through a plurality of rollers, at least a majority of which are mounted for axial movement so as to follow deformations of the track.

A further object of the invention is to provide for the turning of a turret so mounted by means of a gear engaging a rack on the track, in which the rollers nearest the gear are not axially movable, so as to preserve accurate engagement between the rack and gear.

A further object of the invention is to provide a turret which may be sealed off as a single unit, so that the same can be supercharged.

Still another object of the invention is to provide a novel mechanism for turning the turret and controlling the turning movement thereof, with mountings so arranged that fluid under pressure for operating the turning mechanism may be supplied from the outside to control mechanism in the turret and thence to the motors for turning the turret in every position thereof. More specifically, this feature of the invention involves the provision of novel joint constructions for turning of the turret about two mutually perpendicular axes while permitting the supply of fluid to the turret whatever its position may be.

Another object of the invention is to provide a novel valve for controlling the supply of pressure fluid which prevents shocks to the motors and permits slow and accurate maneuvering of the turret.

A further feature of the invention resides in the mounting of the motor for causing the turret to turn about a perpendicular axis on the movable support, so that supply of fluid from control means within the turret need pass only through a single swivel.

Other objects and advantages of the invention will appear more fully from the following description, particularly when taken in conjunction with the accompanying drawings, which form a part thereof.

In the drawings:

Fig. 1 is a front elevation of a turret structure embodying my invention;

Fig. 2 is a side view of the same;

Fig. 3a and Fig. 3b are the left and right-hand portions respectively of a cross section on the line 3—3 in Fig. 2;

Fig. 4a and Fig. 4b are the left and right-hand portions respectively of a cross section on the line 4—4 of Fig. 1;

Fig. 5 is a detail principally in section on the line 5—5 of Fig. 4a showing the bottom swivel;

Figure 12:
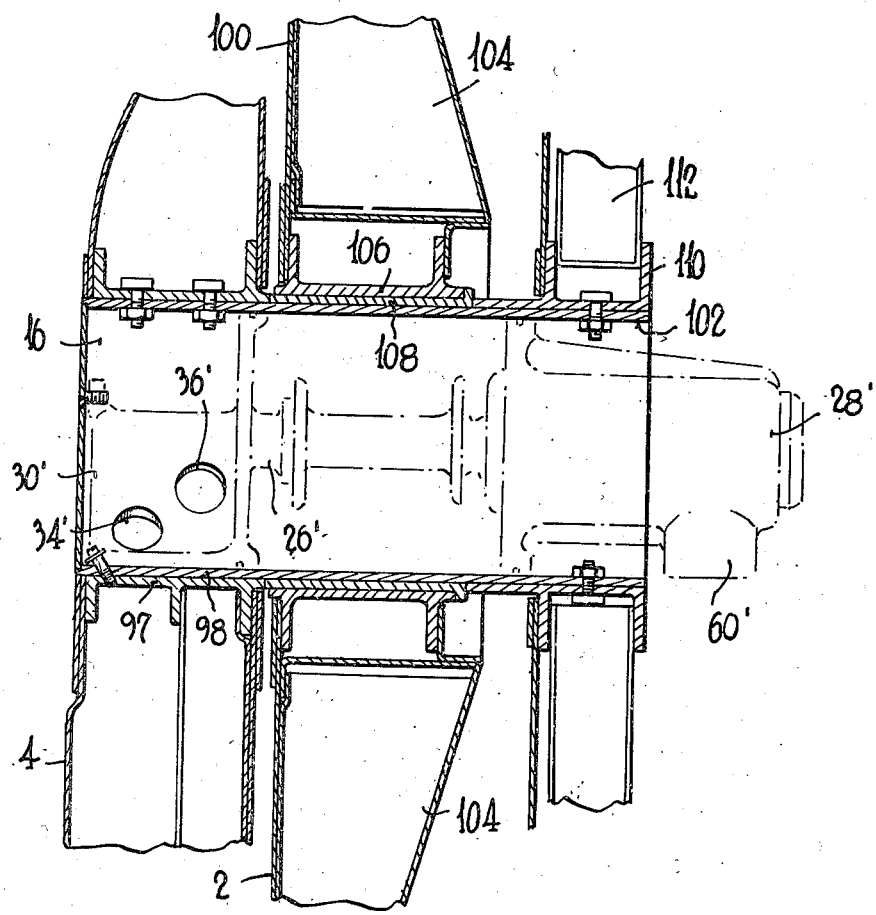
Figure 15:
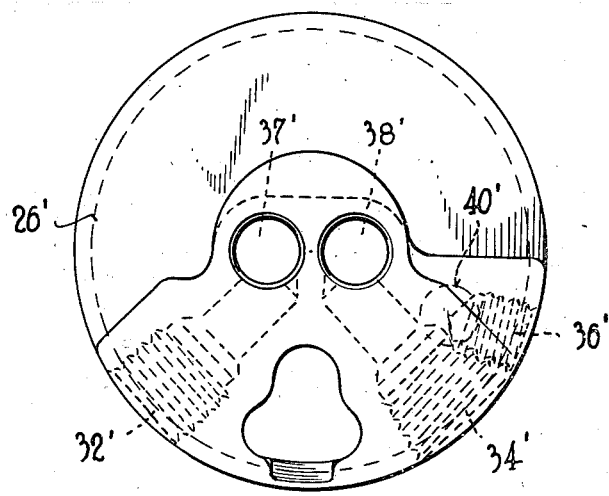
Figure 16:
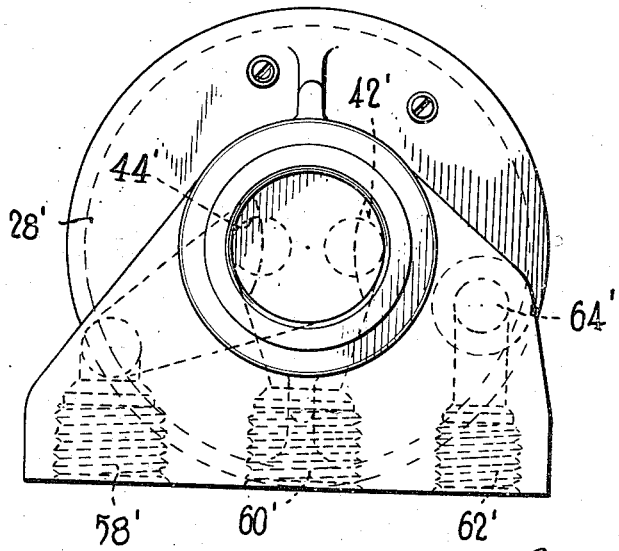

Figs. 6, 7 and 8 are cross sections on the lines 6—6, 7—7 and 8—8 respectively of Fig. 5;

Fig. 9 is a cross section on the line 9—9 of Fig. 8;

Figs. 10 and 11 are cross sections on the lines 10—10 and 11—11 respectively of Fig. 5;

Fig. 12 is a cross section on the line 12—12 of Fig. 4a showing the left-hand side swivel;

Fig. 13 is a detail view of the swivel structure of Fig. 12, partly in section;

Fig. 14 is a view of the distributing plate of Fig. 13;

Fig. 15 and Fig. 16 are views from the left and right-hand ends respectively of Fig. 13;

Fig. 17 shows in side elevation partly broken away the mechanism for turning the turret about a horizontal axis;

Fig. 18 and Fig. 19 are cross sections on the lines 18—18 and 19—19 respectively of Fig. 17;

Fig. 20 is a cross section through the right-hand horizontal swivel;

Fig. 21 is a detail view of a portion of the swivel mechanism of Fig. 20;

Fig. 22 is a top plan view of the control member and some of the connections therefor;

Fig. 23 shows the control member in side elevation;

Figs. 24, 25 and 26 are cross sections on the lines 24—24, 25—25 and 26—26 respectively of Fig. 23;

Fig. 27 is a perspective view of one of the sleeves which cooperates with the slide valves.

Fig. 28 is a cross section on the line 28—28 of Fig. 27.

Fig. 29 is a cross section on the line 29—29 of Fig. 28.

Figure 31:
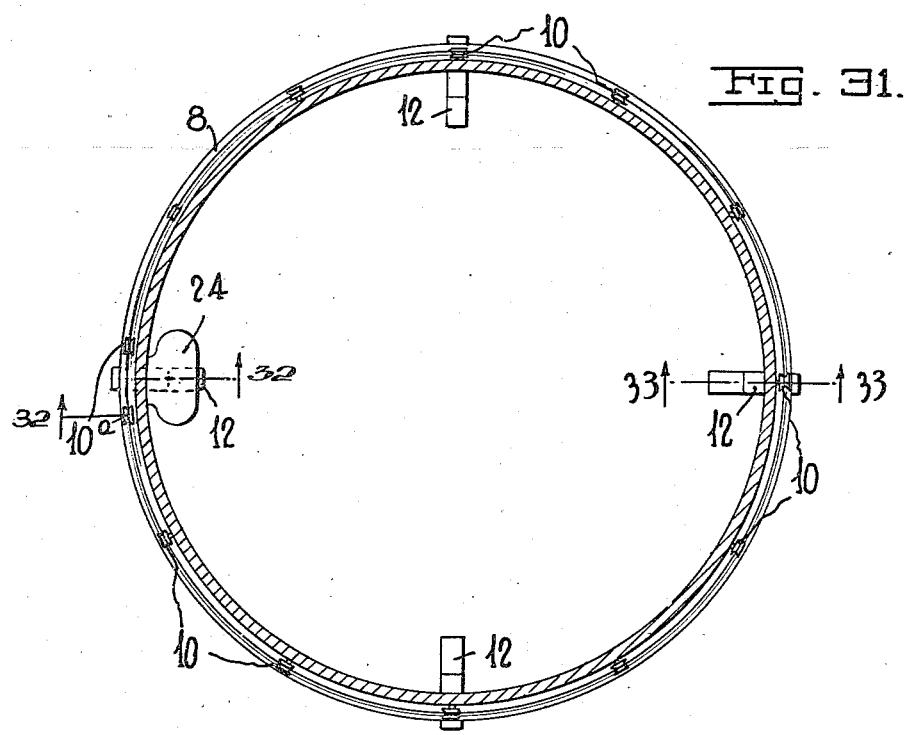
Figure 32:
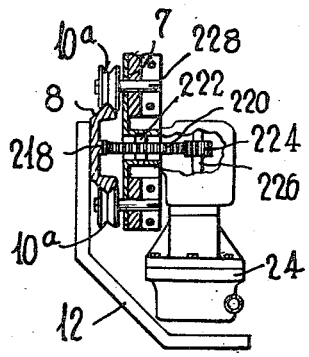
Figure 34:
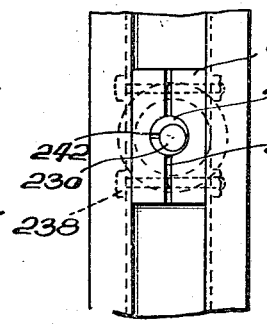
Figure 33:
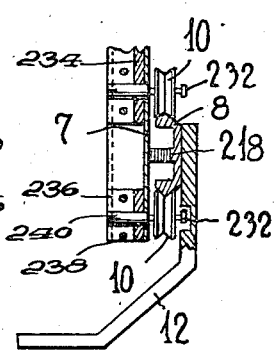
Figure 35:
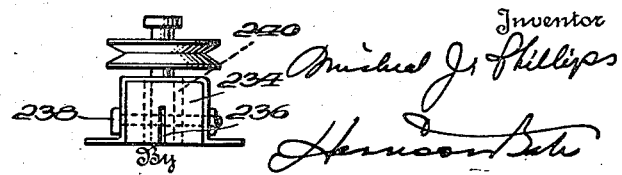

Fig. 30 is a diagrammatic showing of the path of fluid through the control and operating mechanism;

Fig. 31 is a cross section on the line 31—31 of Fig. 1;

Figs. 32 and 33 are cross sections on the lines 32—32 and 33—33 respectively of Fig. 28; and Figs. 34 and 35 show the mounting means for one of the rollers in side elevation and top plan view respectively.

The device according to the invention comprises in general a spherical turret 2 which is to be mounted to turn about two mutually perpendicular axes, and to be controlled in position by a gunner or the like sitting within the turret. The turret 2 is mounted in ears 4 of a ring 6, so as to turn with respect to the ring about a horizontal axis. The ring 6 has a downward projection 7 mounted on a track 8 by rollers 10 on both sides of, that is, above and below, the track to turn about a vertical axis. The track 8 is carried by braces or frame members 12 which may be secured to any suitable part of the aircraft.

The operation of the turret, or, in other words, its movement about the two mutually perpendicular axes, is produced by hydraulic mechanism. The control is exercised by an operator seated within the turret. This requires that fluid under pressure from a source outside the turret shall pass into the turret, through a control mechanism therein, and then again at least partially outside the turret to produce the movement about one of the axes. For this purpose it is evident that mechanism must be provided which will permit the supply of fluid to the turret in different positions thereof, for example first through a swivel turning about a vertical axis and then through a swivel turning about a horizontal axis, so that this fluid may enter the turret. Inasmuch as the turret preferably is capable of turning indefinitely in any direction, and particularly about one of the axes, it is evident that flexible tubing or the like would not accomplish the desired results.

For that reason, as shown generally in Figs. 3a, 3b, 4a and 4b, fluid under pressure is supplied to and withdrawn from a bottom vertical axis swivel 14. From this swivel joint it is supplied to the left-hand swivel joint 16, which has a horizontal axis, and thence to the control mechanism 18. From the control mechanism a part of the fluid passes to the motor 20 of the mechanism which produces turning of the turret around the horizontal axis. Other fluid passes to the right-hand swivel 22 and thence to the motor 24, which produces turning on the ring 6 about the vertical axis of the track 8.

Obviously, in each of these swivels there are preferably provided two lines for the entrance and exit respectively of fluid under pressure. Furthermore, passages for other purposes may be provided. For example, as will be shown, the lower swivel 14 and the left-hand swivel 16 provide for continuous telephonic or other electrical communication therethrough.

Referring now to the details of the mechanism, the lower swivel 14 will first be described (Figs. 5 to 11). This swivel comprises a stationary portion indicated in general at 26 and a rotatable portion indicated in general at 28.

The stationary portion has at one end a boss or projection 30 in which are provided three inlets, inlets 32 and 34 serving for fluid under pressure, and inlet 36 serving for a telephonic or other electric cable. Each of these inlets communicates with passages designated 37, 38 and 40 respectively. Passages 37 and 38 extend through the body of the member 26, into the portion 41 of the stationary member upon which the movable portion 28 is turnably mounted. In the portion 41 there are two segmental grooves or notches 42 and 44 communicating with the ends of passages 37 and 38 respectively.

The member 28 is held between two flanges 46 and 48, the first integral with the member 26 and the second formed on a sleeve 50 threadedly engaged on the end of the portion 41. The portion 50 spaces the member 28 from the member 41. Within this space are provided four spaced rings 52, the spaces between each pair of rings being opposite the notches 42 and 44. The rings are held in spaced relation by thin plate members 54 of annular shape provided with numerous apertures 56 so as to permit the passage of oil therethrough.

Within the fixed portion 28 are three outlet passages 58, 60 and 62. Passages 58 and 60 communicate respectively, as shown in Figs. 5 and 10, with the spaces between the two pairs of rings 52, and thereby with notches 42 and 44 and passages 37 and 38. Passage 62 communicates with a longitudinal passage 64 opening into the space 65 at the left or outside of flange 46 and block 28, as will be explained below.

It will be evident that when lines for oil are connected to passages 32 and 34, and to passages 58 and 60, the flow of oil through the joint will continue no matter what may be the relative position of member 28 with respect to the fixed member 26, and such oil will always be supplied to the same passage, or, in other words, passage 32 will always be connected to passage 58 and passage 34 to outlet 60.

The member 26 is also provided with an outstanding flange 66, on the inner face of which there is provided a cutout 67 extending around the flange except for two projections 68. These two projections provide for the reception of screws 70 which serve to hold in position a sleeve 72. Sleeve 72 extends inwardly and engages over a flange 74 formed as a portion of member 28. A packing 76 provides a fairly tight joint at this place.

The passage 40 opens into the space formed between the cutout portion 67 and a fiber insulating disc 69 formed of two portions suitably secured together by link members 71. Disc 69 is provided on its inner face with three concentric conducting rings 73. The links serve to connect the two halves of the disc in cooperation, through conducting pins 75, with conducting rings 73. The disc 69 is secured to the flange 66 by screws 78.

The electric cable 80 which passes through the passage 40 has three wires 82 which are separated where the cable emerges into the space 67. Two of these wires pass through a passage 84 formed in the inner part of one of the projections 68. The three wires lead to connections 86 secured to links 71 by pins 75, and thereby the wires are electrically connected to the rings 73.

A similar cable 87 passes through the passage 64 into the space 65 (see Fig. 11). There the three wires 88 are separated and lead respectively to three contacts 90 secured on an insulating block 92 connected by a screw 94 to the flange 74. These contacts are bent outwardly so as to engage the three rings 73 respectively, as shown particularly in Fig. 5.

It is now evident that as the member 28 turns with respect to the member 26 a constant electrical connection through three lines will be preserved.

The left-hand side swivel joint (Figs. 12 to 16) is likewise provided with two oil passages and a provision for the passage of electric current. In general, it is similar to the bottom swivel joint. A flanged ring 97, and within such ring a sleeve 98, are secured in the upstanding ear 4. Within the outer portion of sleeve 98 is a fixed part 26', and within the inner portion is a movable part 28', the numbers with prime characters being used to indicate the members corresponding to those in Figs. 5 to 11. The fixed and movable members, without the sleeve, are shown in more detail in Fig. 13. It will be noted that there are provided two oil passages 32' and 34', and an electrical passage 36', all in the fixed member (see Fig. 15). These communicate with the through passages 37', 38' and 40'. Passages 37' and 38' open through notches 42' and 44' into spaces between rings 52' and thence into outlet passages 58' and 60'.

The electrical connection is made through a segmental disc 69' (Fig. 14), bearing the three conducting rings 73'. Connection to the rings is made through members 86', from wires 82'. Contact members 90' mounted on block 92' engage rings 73', and wires from these contact members lead to passage 62'. In the particular embodiment of the invention shown in the drawings, it is unnecessary in the side swivels to have a full circular disc 69', inasmuch as the device need turn about its horizontal axis only through a limited field. Obviously, however, the angular extent of this disc could be modified with variations in the necessary travel of the sphere.

The mechanism for causing the sphere to turn about its horizontal axis, which is adjacent to and closely related with the left-hand swivel, will now be described (see Figs. 12 and 17 to 19).

As was stated above, the sleeve 98 (Fig. 12) is secured in the ear 4 upstanding from the ring 6. This sleeve extends through the side wall 100 of the turret, and its inner portion 102 is located well within the side wall. The side wall 100 of the turret is flattened, as is evident, and is provided with suitable bracing members 104. The side wall and the bracing members are secured to a sleeve 106 which runs on a bearing 108 carried by the sleeve 98. Thus the turret is mounted for turning about the sleeve 98.

On the inner end 102 of the sleeve 98 is fixedly secured an annular channel member 110. From this channel member extends a series of spokes 112, which on their outer periphery support a segmental rack 114, this rack being concealed by a shield 116.

Secured on one of the frame members 104 of the sphere wall are brackets 118 supporting a tube 120 substantially tangential to the segmental gear 114. Mounted on one end of the tube is the motor 20. This is a hydraulic motor, the method of supply to which will be described below. The motor shaft 124 through a coupling drives a worm 126 located within the slotted tube 120 and engaging the segmental worm gear 114. The other end of shaft 126 is provided with a hand wheel 128 for manual operation in case of emergency.

It will be evident from this description that, since the worm gear 114 is stationary through its rigid connection to sleeve 98 fixed in ear 4, operation of the motor and subsequent turning of worm 126 will move the motor about the swivel as an axis and, since the motor is rigid with the sphere, will also cause movement of the sphere. The angular extent of worm gear 114 is of course sufficient to insure any necessary turning of the turret about its horizontal axis.

The right-hand swivel is shown in Figs. 20 and 21, and corresponds in general to the left-hand swivel except that no electrical connections are provided, nor is there any mechanism for turning the turret associated therewith. In this device reference characters with double prime indicia have been used in correspondence with the corresponding elements of Figs. 5 to 11. There are two inlets such as 34'' which lead to notches 42'' and 44'', and thence to outlets such as 58''. The whole unit is mounted within a sleeve 98'' secured in the ear 4, and supporting by bearing 108'' the sleeve 106'' mounted in the wall 100 of the turret.

The mechanism for controlling the operation of the turret, or, in other words, the supply of fluid under pressure to the different motors, will now be described. This mechanism is intended to be operated by a single stick similar to the ordinary joy stick of the aircraft. In other words, the turret is to be caused to move in the direction corresponding to the movement of the stick.

The control mechanism is indicated in general at 18. It includes a casing having a main or fulcrum portion 132 and two regulating portions 134 and 136 for the two motors respectively, these regulating portions being arranged in directions perpendicular to each other from the main portion 132. The main portion 132 includes a spherical seat 138 engaging the top surface of a ball joint 140, the bottom surface of this joint engaging another spherical portion 142. The ball joint is rigid with a control stick 144, so that this control stick can be swung in any direction.

Rigid with the ball joint 140 are two arms 146 arranged at right angles to each other and extending to the regulating portions 134 and 136 respectively. Each of these regulating portions includes a valve member composed of vertical rods 148, 149 respectively, each having spaced flanges 150 between which are engaged ball shaped portions 152 on the forked ends of levers 146. It is obvious that by tilting the stick in one direction, for example, up in Fig. 25, the rod 149 will be moved downwardly, without affecting the rod 148, while, on the other hand, by tilting the stick to the right the rod 148 may be moved up without affecting the rod 149. It is thus possible to control either of the valve members 148 and 149 independently, or to move them together by moving the stick at any desired angle.

Fluid such as oil under pressure is supplied in a manner to be described below to an opening 154 in the bottom of member 134, which communicates through a passage 156 with the bottom of member 136. Oil under pressure is thus supplied to the bottom of each of these regulating devices. Each regulating device is intended to control one of the motors, one (134) for turning the sphere about a vertical axis and the other (136) for turning it about a horizontal axis. Each is for this purpose provided with upper and lower outlets 158, 159 and 160, 161 respectively, so that as fluid is supplied to one or the other of these outlets it may return through the other. Thus the motors may be driven in either direction. The return flow of fluid from the control mechanism is permitted through an outlet 162 provided in the portion 132 and communicating with the central space 164 of the mechanism.

The valve members 148 and 149 are similar. Valve member 149 only will be described. The body of the valve member is provided with a longitudinal passage 165 running therethrough, and on its ends are hollow enlarged sleeve members 166. This provides communication between the bottom space 168 and the top space 170, so that pressure fluid is present in both of these chambers. Coil springs 172 within the chambers tend to hold the valve in central position.

The sleeve portions 166 slide in spaced metering sleeves 174 (see Figs. 27 to 29). These sleeves have flanges 176a, forming therebetween spaces 175 communicating with the outlets 158 and 159. The sleeves 174 are provided with apertures 177. The portions 178 of these openings adjacent the flanges 176 are of a tapering, V-shape, opening on the inner faces of the sleeves (see Figs. 28 and 29). It will be evident that when the valve 149 is moved downwardly, to a sufficient degree, it will open communication between the chamber 170 and the outlet 158. At the same time, the downward movement of the sleeve will open communication between the lower outlet 159 and the space 164 within the control mechanism. The passage will be small when the valve is moved slightly, because of the small cross section of the outer end of portion 178 of the opening. Thus pressure fluid will be supplied at a gradually increasing rate, preventing shocks to the motors and permitting slow and exact maneuvering of the turret when the valve members are moved only by small amounts.

Fluid under pressure then flows, in the examples given, from inlet 154 through pipe 156, lower space 168, passage 164, upper space 170 and outlet 158 to the motor, while return fluid will flow from the aperture 159 through space 164 to outlet 162.

A pressure relief valve mechanism 176 subject to changes in pressure caused by increase in temperature may be provided communicating with spaces 175 so that excess pressure will be relieved.

Fig. 30 shows diagrammatically the direction of flow of fluid under pressure through the apparatus. Oil under pressure, for instance, flows to inlet passage 32 of the lower swivel 14, and through that swivel to outlet passage 58. Thence it flows to the left-hand swivel mechanism 16, entering by passage 32' and coming out inside the sphere by passage 58'. A pipe 180 leads to a manually operable valve 182, with which is connected a check valve 184 to prevent the reverse flow of liquid. A pipe 186 connects this check valve with the control mechanism 18. The pipe 186 leads to the entrance 154 in the lower part of member 134 (Fig. 24) and thus into the lower chamber 168 thereof. Pipe 156 connects this lower chamber with the lower chamber 168 of the member 136. The slide valves 148 and 149 with their central passages 165 are also represented in Fig. 30, to indicate how fluid under pressure may reach the upper spaces 170. The return fluid passes out through a pipe 187, passage 60', passage 34', passage 60 and passage 34 where it may be returned to a reservoir and reused.

Outlets 160 and 161 of the member 136 are connected respectively to pipes 188 and 190, which lead through a suitable shock absorber 192 to the vertical motor 20 (Fig. 19) which serves to turn the spherical turret about its horizontal axis. This is a two-way motor, and the direction of rotation depends on the direction in which the pressure fluid is fed into it. The flow into the motor is controlled obviously by the position of slide valve 148, since when this valve is raised the pressure fluid will flow through pipe 190 and fluid will return through pipe 188. Thus by varying the position of the valve the motor may be caused to remain stationary or to run in either direction.

Outlets 158 and 159 from control member 134 lead to pipes 194 and 196 respectively. These pipes lead through a second shock absorber 198 to the right-hand swivel, where they enter through inlets 58" and 60" and pass out through outlets 32" and 34". Pipes 200 and 202 lead to the second motor 24 which serves for turning the device around a horizontal axis, as will be explained in connection with the following figures.

The central chamber 164 of the control mechanism has an outlet 162 connected through a pipe 206 to a cross pipe connection 208. A second arm of this cross is connected to the return pipe 187. Into this cross also lead pipes 210 from relief valves 176 connected to spaces 175. Any excess pressure will thus be relieved and returned to the reservoir.

The fourth arm of the cross is connected by pipe 212 to a hand pump 214 operated by a handle 215, on the inlet side thereof, the outlet side of this pump being connected by a pipe 216 to the input line 186, that is, in front of the check valve 184. It will be evident that if the main pump does not operate the hand pump may be used and will then cause the circulation of fluid through the system, so that the turret may be manually operated by anyone from within.

One of the important features of the invention resides in the mounting and driving of the turret to turn about its vertical axis. Details of this construction are shown in Figs. 31 to 35. The track 8, as has been explained above, is engaged by rollers 10 mounted on the ring extension 7. On the inner wall the track carries a continuous rack 218. This is engaged by a gear 220 mounted on a spindle 222 in the ring extension 7. Gear 220 in turn is driven by a smaller gear 224 mounted on the drive shaft 226 of the motor 24. Motor 24 is suitably mounted on the ring extension 7, where it is to some extent protected by braces 12. It will be evident that when motor 24 is driven to rotate gear 220, ring 6 will be caused to turn with respect to the fixed track 8, so that the whole turret will turn about a vertical axis.

It is evident that the track 8 may not be formed exactly as a circle, or may be distorted from its circular shape either during installation or operation. In order to prevent this from causing binding, while still insuring the proper drive of the turret at all times, a special mounting of the rollers is utilized. Rollers 10a adjacent the motor 24 are mounted between shoulders on pins 228, so as to be incapable of sliding on these pins. This of course holds the motor 24 and gear 220 in exact relation to the rack 218, so that the motor will drive the turret at all times.

On the other hand, the other rollers 10 are mounted on pins 230 so as to be capable of moving axially thereon, such axial movement being limited outwardly by nuts 232 and inwardly by the body of the ring 6. Thus if the track becomes distorted from its normal circular shape, the rollers can still follow the curvature thereof without danger of binding.

Rollers 10 and 10a are preferably mounted for adjustment towards and from the track. As shown in detail in Figs. 34 and 35, ring extension 7 carries blocks 234 of resilient metal each having a slot 236 therein. The two sections on opposite sides of the slot may be tightened by bolts 238. Pins 230 are mounted in excentric sleeves 240 passing through blocks 234, and provided at their inner ends with slots 242 to permit them to be turned.

By loosening bolts 238, sleeves 240 may be turned to raise or lower pins 230 and rollers 10, so as to move the track. The projection of pins 230 may also be adjusted. The tightening of the bolts then holds the parts in their adjusted position.

It is evident from the above description that when the gunner sits in the turret, he may control the position of the same by moving the control stick suitably. Also, telephonic communication or other electric signalling is provided at all times, so that the gunner may communicate with the remainder of the plane.

As will be evident, particularly from Figs. 1, 2 and 3, the side walls 100 of the turret adjacent the horizontal swivels are flattened. The ears 4 which are upstanding from the ring 6 have flat inner faces opposite the flat walls 100, while their outer faces at least in part are given the shape of a section of a sphere of the same radius as the turret. Thus the outer faces of these ears form a continuation of the spherical surface of the turret at all times. This reduces the aerodynamic resistance, while at the same time it prevents the formation of gaps which might produce eddy currents and thus increase resistance.

The electric cables may be sealed in their passages if it is desired to make the turret airtight, so that it will be substantially hermetically sealed. Under these conditions fresh air for breathing may be supplied from an apparatus within the turret or may be pumped thereinto by passages similar to those provided for the flow of oil. In this way the air in the turret may be kept at any desired pressure.

While I have described herein one embodiment of my invention, I wish it to be understood that I do not intend to limit myself thereby except within the scope of the appended claims.

I claim:

1. In combination, a support, means mounting said support to turn about an axis, means to cause the same to turn about said axis, a turret mounted in said support to turn about a second axis perpendicular to said first axis, means to cause the turret to turn about said second axis, control means in said turret, means to supply fluid under pressure from a source to said control means and from said control means independently and simultaneously to each of said turning means.

2. In combination, a ring, means mounting said ring to turn about an axis, means on said ring to cause the same to turn about said axis, a turret mounted in said ring to turn about a second axis perpendicular to said first axis, means carried by said turret to cause the same to turn about said second axis, control means in said turret, means to supply fluid under pressure from a source to said control means and from said control means independently and simultaneously to each of said moving means.

3. In combination, a support, means mounting said support to turn about an axis, a turret, means mounting said turret in said support to turn about a second axis substantially perpendicular to said first axis, a motor for causing the turret to turn about said second axis, a motor carried by said support for causing the same to turn about said first axis, a control member in said turret, a first conducting means for a fluid under pressure carried by said support, means to supply fluid to said first conducting means while permitting the same to turn with said support, a second conducting means within said turret connected to said control member, means to connect said second conducting means to said first conducting means while permitting said turret to turn with respect to said support, a third conducting means connecting said control member to said first motor, a fourth conducting means carried by said support connected to said second motor, a fifth conducting means within said turret connected to said control member, and means connecting said fourth conducting means to said fifth conducting means while permitting said turret to turn with respect to said support.

4. In an aircraft a support, means mounting said support to turn about an axis, a spherical turret, means mounting said turret in said support to turn about a second axis substantially perpendicular to said first axis, a motor within said turret for causing the same to turn about said second axis, a motor carried by said support for causing the same to turn about said first axis, a control member in said turret, a first conducting means for a fluid under pressure carried by said support, means to supply fluid to said first conducting means while permitting the same to turn with said support, a second conducting means within said turret connected to said control member, means to connect said second conducting means to said first conducting means while permitting said turret to turn with respect to said support, a third conducting means connecting said control member to said first motor, a fourth conducting means carried by said support connected to said second motor, a fifth conducting means within said turret connected to said control member, and means connecting said fourth conducting means to said fifth conducting means while permitting said turret to turn with respect to said support.

5. In combination, a substantially circular track, a turret structure, said turret structure comprising a support having rollers thereon engaging said track and guided thereby, a turret carried by said support, said track carrying a rack, a motor carried by said support, a gear mounted to turn on said support and driven by said motor, said gear engaging said rack, at least one roller adjacent said gear being in substantially fixed rotatable relation to said support, and means mounting at least one of said rollers remote from said gear for rotation with respect to said support about its axis and for sliding along said axis.

6. In combination, a substantially circular track, a turret structure, said turret structure comprising a ring having rollers thereon engaging said track and guided thereby, a turret mounted in said ring to turn with respect thereto about an axis substantially perpendicular to the axis of said track, said track having a rack on the inner face thereof, a motor carried by said ring, a gear mounted to turn on said ring and driven by said motor, said gear engaging said rack, at least one roller adjacent said gear being in substantially fixed rotatable relation to said ring, and means mounting at least one of said rollers remote from said gear for rotation with respect to said ring about its axis and for sliding along said axis.

7. In combination, a substantially circular track, a turret structure, said turret structure comprising a ring having rollers thereon engaging said track and guided thereby, a turret mounted in said ring to turn with respect thereto about an axis substantially perpendicular to the axis of said track, said track having a rack on the inner face thereof, a motor carried by said ring, a gear mounted to turn on said ring and driven by said motor, said gear engaging said rack, at least one roller adjacent said gear being in substantially fixed rotatable relation to said ring, means mounting the rollers remote from said gear for rotation with respect to said ring about their axes and for sliding along said axes, a control member within said turret, means to supply fluid under pressure to said control member, and means to conduct fluid from said control member to said motor.

8. In an aircraft, a substantially circular track, a turret structure, said turret structure comprising a ring having rollers thereon engaging said track and guided thereby, a turret mounted in said ring to turn with respect thereto about an axis substantially perpendicular to the axis of said track, said track having a rack on the inner face thereof, a motor carried by said ring, a gear mounted to turn on said ring and driven by said motor, said gear engaging said rack, at least one roller adjacent said gear being in substantially fixed rotatable relation to said ring, means mounting the rollers remote from said gear for rotation with respect to said ring about their axes and for sliding along said axes, a motor within said turret for causing the same to turn about said second axis, a control member in said turret, a first conducting means for a fluid under pressure carried by said ring, means to supply fluid to said conducting means while permitting the same to turn with said ring, a second conducting means within said turret connected to said control member, means to connect said second conducting means to said first conducting means while permitting said turret to turn with respect to said ring, a third conducting means connecting said control member to said second motor, a fourth conducting means carried by said ring and connected to said first motor, a fifth conducting means within said turret connected to said control member, and means connecting said fourth conducting means to said fifth conducting means while permitting said turret to turn with respect to said ring.

9. In combination, a support, means mounting said support to turn about an axis, a turret, means mounting said turret in said support to turn about a second axis substantially perpendicular to said first axis, a motor carried by the turret for causing the same to turn about said second axis, a motor carried by said support for causing the same to turn about said first axis, a control member in said turret, a first conducting means for a fluid under pressure carried by said support, means to supply fluid to said first conducting means while permitting the same to turn with said support, a second conducting means within said turret connected to said control member, means in said turret mounting means to connect said second conducting means to said first conducting means while permitting said turret to turn with respect to said support, a third conducting means connecting said control member to said first motor, a fourth conducting means carried by said support connected to said second motor, a fifth conducting means within said turret connected to said control member, and means in said turret mounting means connecting said fourth conducting means to said fifth conducting means while permitting said turret to turn with respect to said support.

10. Turret supporting structure comprising two elements, one comprising a support for the turret, a substantially circular track carried by one of said elements, a rack carried by the same element, rollers rotatably carried by the other element engaging said track and guided thereby, a gear mounted to turn on said roller-carrying element engaging said rack, means to turn said gear, at least one roller adjacent said gear being in substantially fixed rotatable relation to said roller-carrying element, and means mounting at least one of said rollers remote from said gear for rotation with respect to said roller-carrying element about its axis and for sliding along said axis.

MICHAEL J. PHILLIPS.